Dec. 12, 1961   E. A. BROWN   3,012,818
BENCH CONSTRUCTION
Original Filed Feb. 2, 1959

INVENTOR
Eric A. Brown
BY Alex. E. MacRae
ATTORNEY

3,012,818
BENCH CONSTRUCTION
Eric A. Brown, Renfrew, Ontario, Canada, assignor to Polyfibre Limited, Renfrew, Ontario, Canada
Original application Feb. 2, 1959, Ser. No. 790,610. Divided and this application May 12, 1961, Ser. No. 109,624
1 Claim. (Cl. 297—248)

This invention relates to multiple bench or seat construction, and is a division of application Serial No. 790,610, filed February 2, 1959.

An object of this invention is to provide a bench or seat structure which may be readily eracted to accommodate any desired number of seats, which is subject of convenient and rapid assembly and disassembly for ease of transportation, storage and the like, which possesses satisfactory strength and rigidity in use, and which is of increased comfort to the user.

The invention contemplates the provision of a bench or seat structure comprising a plurality of preformed seats each having a seat section, a back section, and a flange extending rearwardly from each of the side edges of said sections, each said flange having a plurality of apertures therein, a plurality of rods each arranged to extend through one of said apertures in each said flange to lock said seats in assembled relation, and means engageable by said rods to support said rods and seats in upright position.

Figure 1:
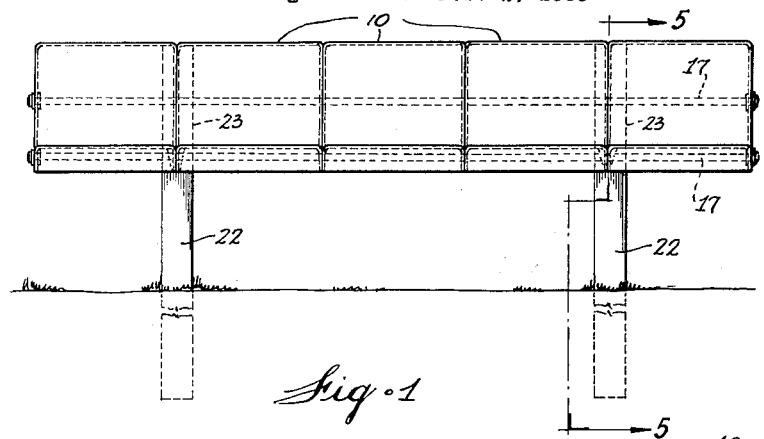
Figures 2, 4:
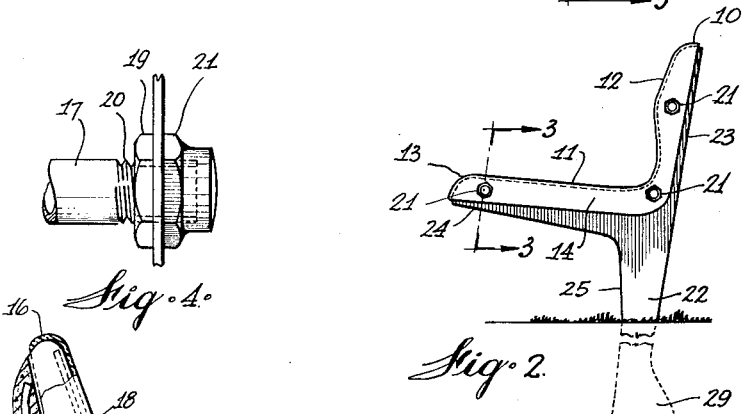
Figures 3, 5:
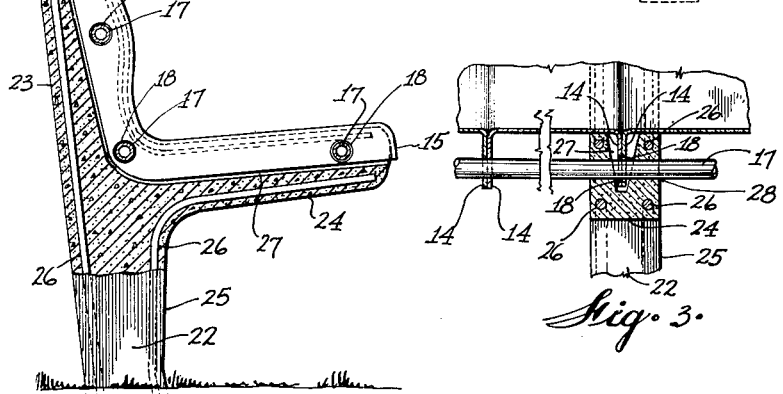

The invention will be described with reference to the accompanying drawings, in which:

FIGURE 1 is a side elevation of a bench structure in accordance with the invention, FIGURE 2 is an end elevation of the structure shown in FIGURE 1, FIGURE 3 is a partial section on line 3—3 of FIGURE 2, FIGURE 4 is a side elevation of a rod securing means, and FIGURE 5 is a section on line 5—5 of FIGURE 1.

In accordance with the invention, a plurality of individual or separate seat units 10 are provided each comprising a seat section 11 and a back section 12. Each section 11 and 12 has a forward surface 13 appropriately shaped to provide desired comfort to the user and rearwardly extending side edge flanges 14.

Preferably, each unit 10 is of one-piece molded construction and may be formed of a plastic composition such as polyester reinforced with glass fibers. As shown, the edge portion 15 of seat section 11 and the edge portion 16 of back section 12 are rearwardly curved and terminate in line with the rear edges of the flanges 14.

Means for assembling a plurality of seat units 10 in an aligned row to form a bench comprises a plurality of rods 17 which may consist of conventional pipe sections. Each rod 17 extends through aligned apertures 18 in the two flanges 14 of each unit 10. The diameter of each aperture 18 is such as to snugly receive the rod 17, i.e., it is slightly in excess of the external diameter of the rod to permit passage of the rod therethrough.

Each one of the rods 17 extends through each of the seat and back sections of the aligned units 10. As shown, three rods 17 are provided, one extending through the seat sections, one extending through the back sections, and one extending through the juncture areas between the two sections.

The seat units are aligned on the rods 17 with the flanges of adjacent seat units 10 in engagement. The units are maintained in such position by means of lock nuts 19 on threaded end portions 20 of the rods, such nuts being screwed into engagement with the inner surface of each end flange 14. A flange cap 21 is applied to the outer end of each rod.

The mounting means for supporting the multiple seat bench in elevated upright position for use comprises one or more leg members 22. Each leg member 22 has an upright portion 23 adapted to underlie a portion of a back section of a unit 10, a forwardly extending portion 24 adapted to underlie a portion of a seat section of a unit 10, and downwardly extending portion 25 constituting a leg.

As shown, each leg member 22 is of concrete construction provided with metal reinforcements 26. Preferably, the surfaces of the member for engagement by the seat units are of complementary shape. Means for locking the bench to each leg member comprises a groove 27 extending inwardly from the face of the portions 23 and 24 of the leg member and extending continuously between the ends of such portions. As shown in FIGURE 3, groove 27 is arranged to receive the abutting flanges 14 of an adjacent pair of seat units 10. The leg member also has a plurality of pairs of aligned holes 28, the axis of which extends across the groove 27 for alignment with the aligned apertures 18 in the flanges 14. It will thus be apparent that, following positioning of a pair of seat units 10, on a leg member 22, the rods 17 may be passed through the holes 28 and apertures 18 to lock the seat units to the leg member.

By reference to FIGURE 1, it will be observed that a bench comprising but two seat units 10 supported on a single leg member 22 may be provided. Should a longer bench be required an additional leg member and additional seat units may be provided as shown in FIGURE 1.

If a bench is to be located in a park or the like, the leg 25 of each leg member 22 may be of extended length, as shown, for burying in the ground. The end portion of the leg 25 may be enlarged as indicated at 29 to constitute an anchor.

There has thus been provided a multiple seat bench structure which is capable of easy and convenient erection and dissembly as required. Moreover, the bench structure described is capable of ready extension from two to any desired number of seat units.

I claim:

A bench structure comprising a plurality of preformed seats each having a seat section and a back section, each said seat having a flange on each side edge thereof, each said flange having a portion extending downwardly from said seat section and a portion extending rearwardly from said back section, said seats being aligned with at least one of said flanges of one of said seats in abutment with one of said flanges of another of said seats, each said flange having at least one aperture in each of said portions thereof, a rod extending through said apertures in said seat section flange portions, a rod extending through said apertures in said back section flange portions, means on the ends of said rods to lock said seats together, and means engaging said rods to support said rods and seats in upright position comprising at least two leg members each having an upright portion, a forwardly extending portion, and a leg portion, said upright and forwardly extending portions having seat engageable surfaces, said surfaces having a groove therein, said groove being arranged to receive said flanges of two adjacent seats, said upright and forwardly extending portions having holes therein each in alignment with a series of said apertures for reception of one of said rods.

References Cited in the file of this patent

UNITED STATES PATENTS

| | | |
|---|---|---|
| 724,583 | Jones | Apr. 7, 1903 |
| 1,721,601 | McClure | July 23, 1929 |
| 2,588,417 | Schladermundt et al. | Mar. 11, 1952 |

FOREIGN PATENTS

| | | |
|---|---|---|
| 866,991 | Germany | Feb. 12, 1953 |
| 1,142,580 | France | Apr. 1, 1957 |